Jan. 27, 1959  A. BECHLER  2,870,656
TURRET INDEXING MECHANISM FOR AUTOMATIC LATHE
Filed Dec. 21, 1953  2 Sheets-Sheet 1

United States Patent Office 2,870,656
Patented Jan. 27, 1959

2,870,656

TURRET INDEXING MECHANISM FOR AUTOMATIC LATHE

André Bechler, Moutier, Switzerland

Application December 21, 1953, Serial No. 399,288

Claims priority, application Switzerland December 30, 1952

2 Claims. (Cl. 74—822)

The present invention relates to automatic lathes having a turret carrying tools such as drills and screw taps. It relates more particularly to a mechanism for indexing the turret of an automatic lathe comprising a camshaft having one or more cams fixed thereto and intended to control the movements of the tools, including at least one of those arranged on the turret as well as other tools otherwise movably mounted on the machine in a manner well known to those skilled in the art.

In some known lathes of this type, a disc secured to the camshaft has cams secured to it which are adjustable along its circumference, the number of these cams being equal to the pins secured to the turret and adapted to be engaged by a moving indexing finger, as well as to the number of notches provided at the circumference of the turret and adapted to be engaged, after each indexing movement of the turret, by a locking finger.

In such lathes means are often provided which permit the rotary speed of the camshaft to be changed in dependence on the size of the workpieces, so that similar machining operations differing from one another only in their duration may be controlled by one cam. It is easy to understand that if, as usual in the type of machine referred to above, the several movements of an indexing operation are controlled by one or more cams secured to the camshaft, the duration of these movements and of the whole indexing operation depends on the rotary speed of the camshaft.

The main object of the present invention is to avoid this drawback and to render the duration of the indexing operation independent of the rotary speed of said camshaft although the beginning of the indexing operation is controlled by this camshaft.

It is known in the construction of machine tools that the smoothness of operation and dependability of hydraulic controls are often better than those of the pure mechanical type.

A further object of the present invention is to incorporate in the indexing mechanism a hydraulic device to obtain the above mentioned advantages.

Figure 1:
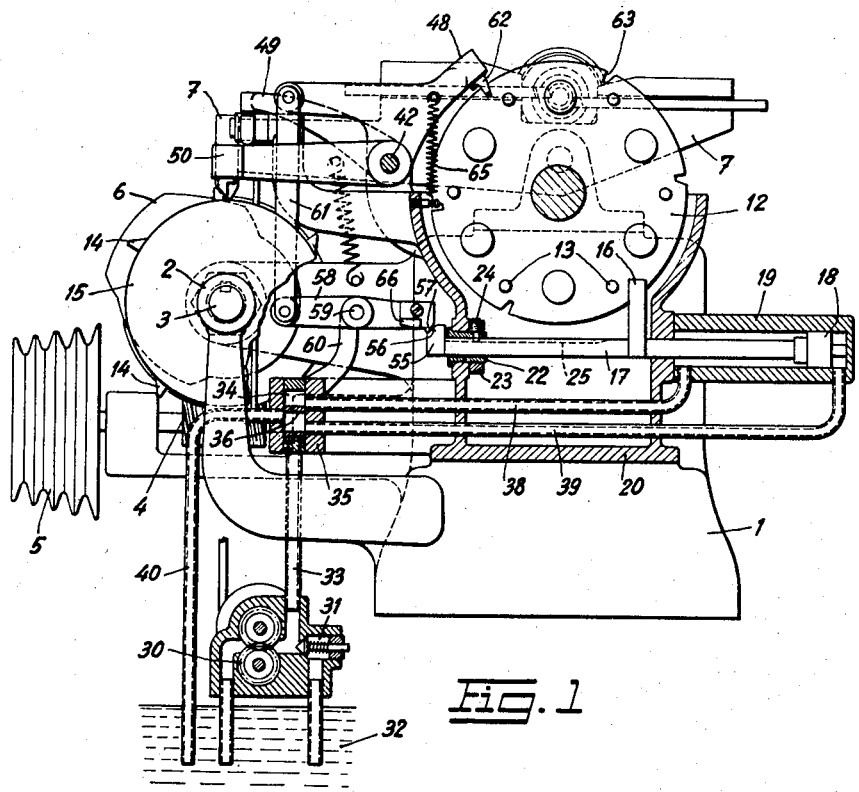
Figure 4:
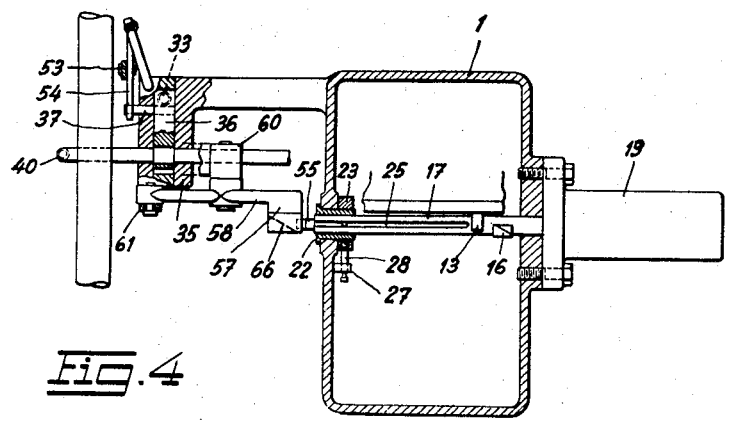
Figure 2:
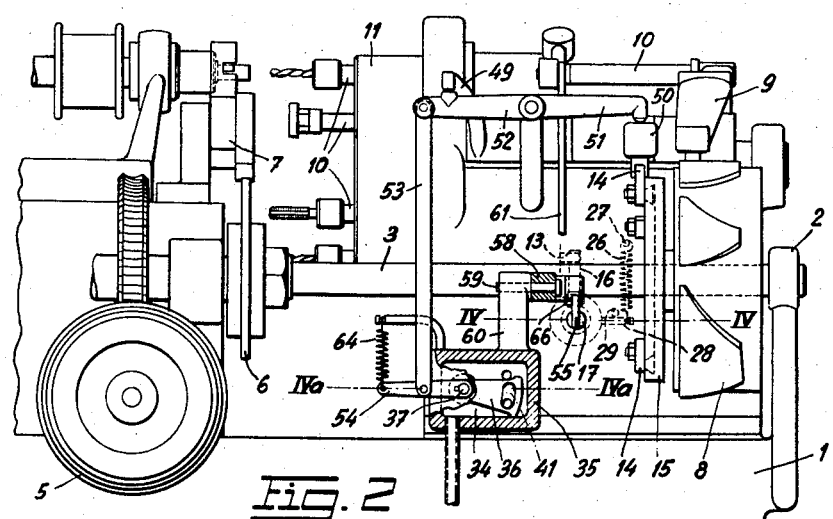
Figure 3:
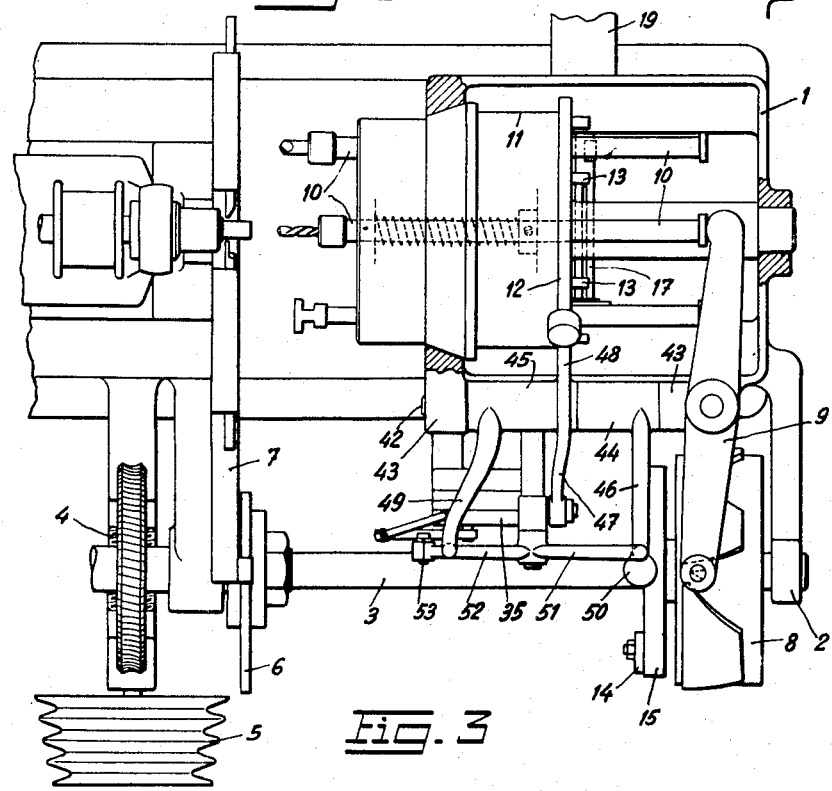

Other features and objects of the invention will appear in the description which follows of an illustrative embodiment of the invention which is represented somewhat diagrammatically in the accompanying drawings in which:

Fig. 1 is an elevational and partly sectional view of an indexing mechanism and adjacent parts of an automatic lathe, Figs. 2 and 3 are a side view and plan view, respectively, corresponding to Fig. 1, and Fig. 4 is a partial plan view, some parts being shown in section along line IVa—IVa of Fig. 2, some other parts being shown in section along line IVb—IVb of Fig. 2.

In the drawings the reference number 1 indicates the bed of an automatic lathe. A cam shaft 3 is rotatably mounted in bearings 2 integral with bed 1 and has mounted thereon a toothed wheel which is constantly in mesh with a worm 4 rigidly connected to a driving cone pulley 5 so that it may be rotated at any one of several different speeds by a motor which is not shown.

A cam disc 6 is secured to the camshaft 3 and adapted to control the movements of a rocking member 7 pivoted to a fixed part of the lathe and carrying two lathe tools. A further cam member 8 secured to camshaft 3 is adapted to control by means of a lever 9 the advance and return movement of that one of the several parallel tool holders 10, movably mounted in a turret 11, which is in working position, i. e. axially aligned on the workpiece.

It should be noted that the arrangement and number of the parts designated by the reference numerals 6 to 10 may be varied according to the particular requirement. The invention is not concerned with this part of the construction.

A disc shaped part 12 of the turret 11 has pins 13 secured thereto and arranged in a circle concentric to the axis of revolution of the turret 11 and at equal intervals from one another. The number of pins 13 is equal to that of the tool holders 10 and to that of drivers 14 mounted on a disc 15 fixed to the camshaft 3, said drivers 14 being adjustable along the circumference of disc 15.

An indexing finger 16 is secured to an indexing rod 17 which is connected to a hydraulic piston 18 arranged for reciprocating motion in a cylinder 19 secured to a support 20 on which the turret 11 is mounted so as to be rotatable about an axis parallel to the "turning axis," i. e. the axis about which the workpiece or bar rotates when it is being machined. The rod 17 is slidably supported in a bore of the portion of support 20 adjacent to cylinder 19 and in the central bore of a sleeve 22 rotatably mounted in a bore provided in another portion of the support 20. Sleeve 22 is prevented from moving axially by the presence of a shoulder integral with it, at one end, and a ring 23 secured to its other end by means of a screw 24. Screw 24 engages with its forward end a longitudinal groove 25 provided in rod 17. A pull spring 26 has one end attached to a pin 27 secured to the support 20 and its other end attached to a pin 28 secured to the ring 23 and adapted to normally abut against a pin 29 secured to the support 20, thereby holding the ring 23 and the rod 17 in the angular position shown in the drawings in which the indexing finger 16 extends upwardly in a vertical plane crossing the pins 13.

In Fig. 1 there is shown a gear pump 30 delivering oil or other appropriate liquid either through a spring-loaded relief valve 31 back to a reserve 32 or through a pipe 33 to a chamber 34 of a distributor valve 35 comprising a rocking valve member 36 secured to a rocking shaft 37. In the rest position shown in Fig. 2, the valve member 36 establishes communication from pipe 33 through chamber 34 to a pipe 38 leading to the left-side end (Fig. 2) of cylinder 19, and communication from a pipe 39 leading to the right-side end of cylinder 19 to a pipe 40 leading back to the reserve 32. When valve member 36 has been rocked into its upper working position, communication is established between pipes 33, 39 and communication is also established between pipes 39 and 40 through a hole 41 of the valve member.

Support 20 has two lateral projections to which is secured an axle 42 on which two rigid lever members 44, 45 are mounted to be rotatable independently of each other. Lever member 44 has only one arm 46, lever member 45 has the three arms 47, 48, 49.

Each time one of the drivers 14 engages the tip 50 of arm 46, the latter rocks a lever having two arms 51, 52. This lever rocks, by means of a connecting rod 53, an arm 54 secured to the rocking shaft 37, thereby rocking the valve member 36 to its upper position. The oil delivered by the gear pump 30 is then fed through pipe 39 to the right-side end of cylinder 19 and moves the piston 18 and its rod 17 towards the left (Fig. 1). Well before the indexing finger 16 engages one of the indexing pins 13, a cam member 55 secured to the left-side end of rod 17 engages with its cam surface 56 a tip 57 of a lever 58 rockingly mounted on an axle 59 supported by a bearing 60 rigidly secured to the support 20. The rocking motion of lever 58 is transmitted by a connecting rod 61 to arm 47 of the rocking member 45 the arm 48 of which is provided with a locking finger 62. The latter is thus moved out of one of several notches 63 provided in equally spaced relationship at the circumference of the disc-shaped part 12 of the turret. The number of notches 63 is equal to that of the tool holders 10 and of the pins 13. Later, when the driver 14 has moved past the tip 50 of lever arm 46, a spring 64 attached to the arm 54 would restore the initial position of valve member 36 and of the means 53, 52, 51 and 46 connecting it with tip 50. The piston 18 would be returned to its right-side starting position well before it had completed its stroke and the indexing of the turret 11 would consequently not be completed. This is prevented as follows: when the driver 14 has moved past the tip 50, the turret 11 has already been somewhat rotated by the indexing finger 16 engaging one of the pins 13; the locking finger 62 which, owing to the action of spring 64 has the tendency to return into its active position, is prevented from doing so because it engages the peripheral surface of part 12. Thus, the arm 49 of the locking lever formed by the lever member 45 remains in its lower position and prevents lever 51, 52 from rocking in the clockwise direction (Fig. 2), thereby holding the other connecting means 53, 46 as well as valve member 36 in their respective positions so that piston 18 completes its active stroke and has the indexing finger 16 complete the indexing operation. When the piston 18 reaches the left end of cylinder 19 the oil delivered by the gear pump 30 momentarily passes through the relief valve 31. Since the indexing operation is now completed, the locking finger 62 engages another notch 63 by virtue of the force of a spring 65, thereby locking the turret 11. The rocking motion of the locking lever 45 terminates the action of arm 49 upon the arm 52; and spring 64 is thus permitted to restore the initial position of the valve member 36. Consequently the piston 18 is moved back by the oil flowing now to the cylinder 19 through pipe 38.

In order to prevent, during its return motion, the indexing finger 16 from abutting against one the pins 13, tip 57 has been provided with a cam surface 66 which is engaged by the member 55 passing it. This member therefore must turn aside and takes with it the piston rod 17 and the finger 16 passing beside the pin 13. At the end of the return motion of the piston to its initial position (Fig. 1), tip 55 ceases to act upon member 57 and spring 26 puts the members 22, 23, 16, 17 and 18 back to the position represented in the drawings.

The whole mechanism is ready for a subsequent indexing operated which is started when a further driver 14 engages the tip of follower 50.

Many modifications could be made in the embodiment shown and described by way of example. One such modification would consist of providing a cam surface 56 on cam member 55 which in the direction of the axis of the piston rod is much longer than shown. It is however essential that the action of this cam ceases before the piston has completed its active stroke. Another feature which is essential to the invention is that the indexing finger can be moved with a speed independent of that of camshaft 3 at least when the indexing finger performs its active stroke.

I claim:

1. An indexing mechanism for an automatic lathe comprising, in combination, rotatable means supporting a plurality of indexing pins, a spring-pressed locking arm, said rotatable means having surface areas engageable selectively by said locking arm to hold said means against rotation, an indexing finger movable into engagement with said pins to effect rotational movement of said rotatable means, means for moving said indexing finger, a cam member movable integrally with said indexing finger and lever means engageable by said cam member to lift said locking arm from said areas to free said rotatable means for rotation, said cam member being positioned to lift said locking finger after the indexing operation has been started but before said indexing finger engages one of the indexing pins and to release said finger at the latest by the time the cam member and the indexing finger have completed their active stroke, power means for moving said indexing finger and said cam member, and means automatically actuated upon release of said locking finger to reverse said power means, and means for deflecting said indexing finger out of the path of said indexing pins upon reverse movement of said indexing finger.

2. An indexing mechanism for an automatic lathe comprising, in combination, rotatable means supporting a plurality of indexing pins, a spring-pressed locking arm, said rotatable means having surface areas engageable selectively by said locking arm to hold said means against rotation, an indexing finger movable into engagement with said pins to effect rotational movement of said rotatable means, means for moving said indexing finger, a cam member movable integrally with said indexing finger and lever means engageable by said cam member to lift said locking arm from said areas to free said rotatable means for rotation, said cam member being positioned to lift said locking finger after the indexing operation has been started but before said indexing finger engages one of the indexing pins and to release said finger at the latest by the time the cam member and the indexing finger have completed their active stroke, power means for moving said indexing finger and said cam member, said cam member and said indexing finger being integral with a common rotatable shaft means, means automatically actuated upon release of said locking finger to reverse said power means, and a lever positioned to engage said cam member, said lever having a lateral cam surface acting upon the cam member during its back stroke to deflect said member and thereby to rotate said shaft means to cause said indexing finger to move out of the path of said pins.

References Cited in the file of this patent

UNITED STATES PATENTS

| 116,223 | Rodgers | June 20, 1871 |
| 1,939,887 | Ferris | Dec. 19, 1933 |
| 2,068,084 | Stahlhammer | Jan. 19, 1937 |
| 2,291,382 | Duglin | July 28, 1942 |
| 2,496,118 | Brown | Jan. 31, 1950 |

FOREIGN PATENTS

| 866,776 | Germany | Feb. 12, 1933 |
| 1,052,628 | France | Sept. 23, 1953 |